UNITED STATES PATENT OFFICE.

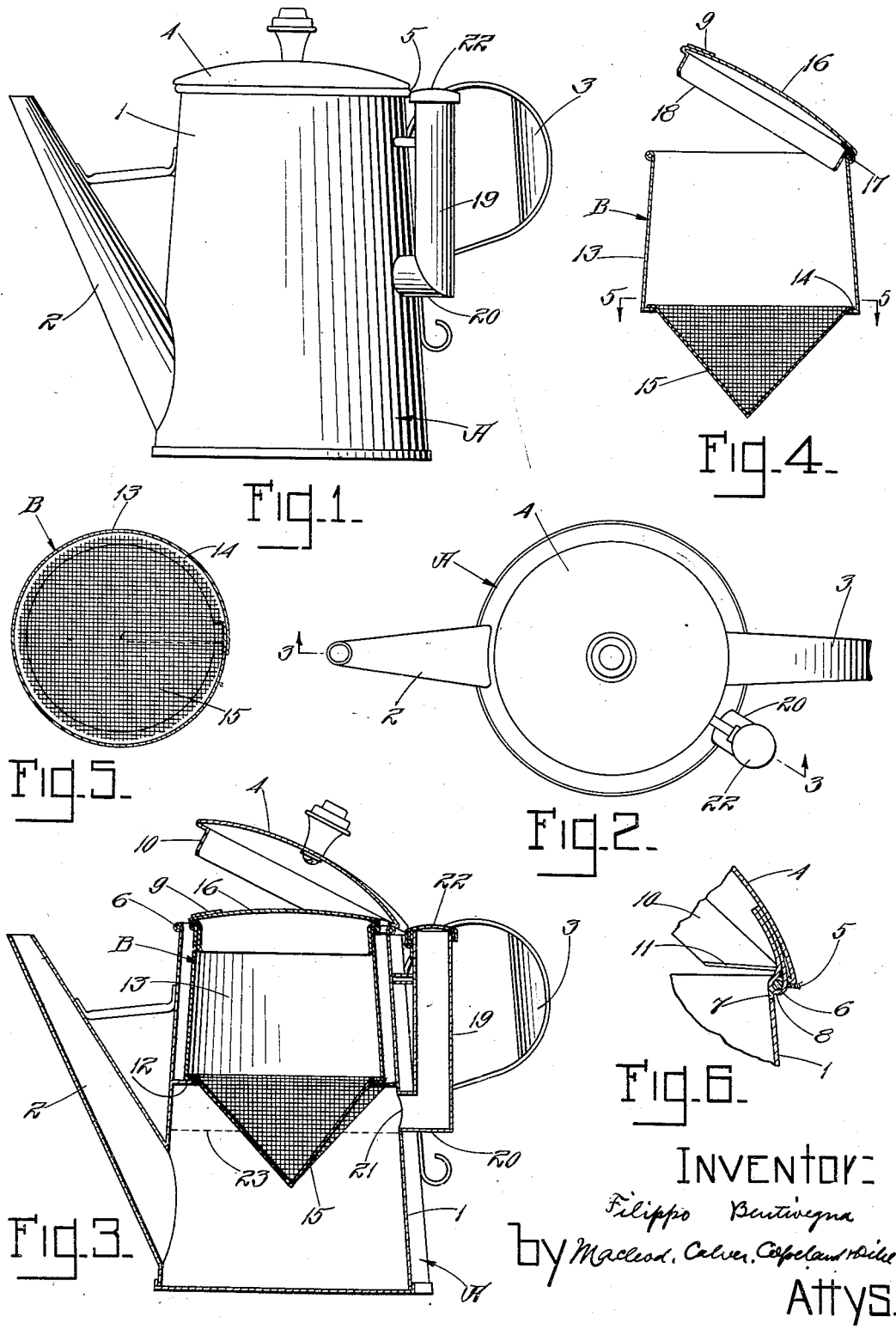

FILIPPO BENTIVEGNA, OF BOSTON, MASSACHUSETTS.

COFFEE-POT.

1,279,830.

Specification of Letters Patent. Patented Sept. 24, 1918.

Application filed January 14, 1918. Serial No. 211,727.

*To all whom it may concern:*

Be it known that I, FILIPPO BENTIVEGNA, a subject of the King of Italy, residing at Boston, county of Suffolk, State of Massachusetts, have invented a certain new and useful Improvement in Coffee-Pots, of which the following is a specification, reference being had therein to the accompanying drawings.

The invention relates to new and useful improvements in coffee pots. One feature of the invention relates to the construction of the pot proper or liquid receptacle; another feature relates to the construction of the ground coffee container; another feature of the invention relates to means by which milk or additional water may be supplied to the pot without removing the ground coffee container or opening the main cover to the pot.

The invention will be fully understood from the following description when taken in connection with the accompanying drawings and the novel features thereof will be pointed out and clearly defined in the claims at the close of this specification.

In the drawings, Figure 1 is a side elevation of a device embodying the invention.

Fig. 2 is a top plan view of the device shown in Fig. 1.

Fig. 3 is a vertical section on line 3—3 of Fig. 2, but showing the cover of the pot turned up part way on its hinge.

Fig. 4 is a vertical sectional view of the ground coffee container detached and showing the cover of the container turned up on its hinge.

Fig. 5 is a sectional view on line 5—5 of Fig. 4.

Fig. 6 is a detail view of the hinge of the cover for the pot.

The size of the mesh of the wire gauze is shown somewhat exaggerated in the drawings, because it is difficult to illustrate it as fine as it should be and be clear.

Referring now to the drawings A represents the main pot or receptacle which holds the liquid and also holds the ground coffee container B.

The body 1 of the pot A is of common form, preferably circular in cross section. It is formed with a pouring spout 2 which has an opening into the body 1 of the pot near its bottom and is provided with a handle 3 for conveniently handling the pot. It is provided with a cover 4 hinged at 5. The preferred method of hinging is as follows: The body of the pot is preferably formed with a wire bead 6 around the top rim, the wire being secured by rolling the top edge of the pot around the wire. The metal of the rolled over portion is cut out for a short distance, forming a slot 7, and a strap 8 is looped around the wire where it is exposed by the slot and said loop is soldered to the inside of the cover 4 thus making a hinge which leaves no protruding portion on the outside. The cover 4 is formed with a flange 10 to shut down within the pot, said flange being cut out to form a slot for the strap 8 of the hinge and is also cut back to form inclined edges 11 to give a better clearance for the hinge in closing the cover.

The pot is formed with an inwardly extending annular flange 12 at a suitable height above the bottom of the pot to furnish a support for the ground coffee container B.

The ground coffee container B has a sheet metal body portion 13 of suitable shape and size to fit easily within the upper part of the pot, and has at its bottom an inwardly extending annular flange 14 which is seated upon the annular flange 12 of the pot.

Secured to said flange 14 of the container is a downwardly extending foraminated bottom portion 15 which is of conical form and is composed of fine wire gauze. It is secured at its upper edge by soldering or other suitable means to the flange 14. I consider that the conical form of the mesh portion 15 is much preferable to any other shape. The water level 23 in the pot may be at least as high as the lower side of the inlet orifice 21 which is to be more particularly described, and the conical mesh portion 15 extends down into the water so that the ground coffee contained therein is subjected to the effective action of the boiling water.

The coffee container 13 is provided with a cover 16 which is hinged at 17 to the rim of the container and provided with a flange 18 to shut down close within the body portion 13. The hinge connection is preferably made by a strap engaging with a wire running around the upper edge of the body portion 13 in a similar manner to the hinge connection of the cover 4 with the pot already described.

Secured to one side of the pot A is a tube having a vertical portion 19 and a horizontal portion 20 at its lower end. The portion 20 communicates with an orifice 21 in the side of the pot just below the flange 12. The upper end of the pipe is provided with a hinged cap 22 which is adapted to shut down tight over the upper end of the tube. By opening the cap 22 water or milk or other liquid may be poured down into the liquid chamber of the pot without removing the ground coffee container B and without opening either the cover 16 of the ground coffee container 13 or the cover 4 of the pot. The inlet orifice 21 should be in the upper part of the liquid chamber so that the water or milk which is poured in shall enter the pot above the liquid already in the pot rather than to have it enter below the surface. If the inlet was below the surface of the liquid already in the pot, the liquid already therein would rise in the tube and prevent the mixing of the fresh liquid with that which is already in the pot. By having the inlet, however, above the surface of the liquid already in the pot, the fresh liquid which is introduced will spread over the surface and may be more readily mixed with what is already therein. This is especially important where it is desired to pour in milk to mix with the coffee. In this way the coffee may first be made in the usual manner and then milk may be introduced and mixed with the coffee before any is poured out. An advantage of this is that by thus mixing the milk with the coffee while the pot is on the stove, it avoids the cooling effect on the coffee which would take place if cold milk was poured directly into a coffee cup, when the coffee is poured for use and avoids the necessity of heating the milk separately. It also has the advantage of mixing the milk with the entire pot full and avoiding the necessity of pouring milk into the cup each time the coffee is poured out for use.

After the milk is poured into the pot through the tube 19 the cap 22 should be closed so as to avoid any escape of the heat through the tube.

The hinge of the cover 16 of the ground coffee container is entirely concealed from view when the cover is closed. The cover is preferably provided with a small piece of metal at 9 secured to the top of the cover diametrically opposite to the hinge to indicate the place where the finger should take hold of the cover to open it. Any suitable marking device however may be employed to indicate the said opposite point from the hinge.

The cover 16 when closed, makes a tight closure for the top of the ground coffee container and preferably the cylindrical body portion 13 of the container is imperforate so that there shall be no escape of the aroma of the coffee out of the top or sides of the container.

What I claim is:

1. A coffee pot comprising an outer main receptacle, a separable container to hold the ground coffee, said container consisting of a substantially cylindrical sheet metal body portion having a downwardly extending conical bottom of fine wire gauze, the apex of the gauze cone extending downwardly, the said main receptacle being formed with an inwardly extending annular flange on which the said sheet metal body portion of the ground coffee container is seated, said main receptacle being provided with a chamber portion below said gauze cone bottom into which said gauze cone bottom extends part way only to the bottom of said chamber, said chamber serving as the container for the liquid and provided with a pouring out spout leading therefrom at some distance below the seat for the ground coffee container, said main receptacle being also provided with a filling in tube attached thereto for water and milk which has an upright portion extending down outside of the said outer receptacle to a point below the level of the upper end of said liquid container and thence turns and enters the said liquid container portion of the outer receptacle at a point just below the upper end of said liquid container.

2. A coffee pot comprising an outer main receptacle, a separable container to hold the ground coffee, said container consisting of a substantially cylindrical sheet metal body portion having a downwardly extending conical bottom of fine wire gauze, the apex of the gauze cone extending downwardly to a point, the said main receptacle being formed with an inwardly extending annular flange on which the said sheet metal body portion of the ground coffee container is seated, said main receptacle being provided with a chamber portion below said gauze cone bottom into which said gauze cone bottom extends part way only to the bottom of said chamber, said chamber serving as the container for the liquid and provided with a pouring out spout leading therefrom at some distance below the seat for the ground coffee container, said main receptacle being also provided with a filling in tube attached thereto for water and milk which has an upright portion extending down outside of the said outer receptacle to a point below the level of the upper end of said liquid container and thence turns and enters the said liquid container portion of the outer receptacle at a point just below the upper end of said liquid container.

In testimony whereof I affix my signature.

FILIPPO BENTIVEGNA.